(12) United States Patent
Nguyen et al.

(10) Patent No.: US 12,345,325 B2
(45) Date of Patent: Jul. 1, 2025

(54) GEARSHIFT ASSEMBLY

(71) Applicant: RB Distribution Inc., Colmar, PA (US)

(72) Inventors: Tam Nguyen, Lincoln University, PA (US); James McMahon, Telford, PA (US); Sean Cattie, Perkasie, PA (US); Bryan McMasters, Lansdale, PA (US)

(73) Assignee: RB Distribution Inc., Colmar, PA (US)

( * ) Notice: Subject to any disclaimer, the term of this patent is extended or adjusted under 35 U.S.C. 154(b) by 0 days.

(21) Appl. No.: 18/493,931

(22) Filed: Oct. 25, 2023

(65) Prior Publication Data

US 2024/0255052 A1    Aug. 1, 2024

Related U.S. Application Data

(60) Provisional application No. 63/481,886, filed on Jan. 27, 2023.

(51) Int. Cl.
F16H 59/04    (2006.01)
(52) U.S. Cl.
CPC ................... F16H 59/041 (2013.01)
(58) Field of Classification Search
CPC .......... F16H 59/041; B62D 1/18; B60K 20/06
See application file for complete search history.

(56) References Cited

U.S. PATENT DOCUMENTS

| | | | | |
|---|---|---|---|---|
| 4,934,209 A | * | 6/1990 | Dewitt | B60R 25/02144 74/473.31 |
| 5,065,641 A | * | 11/1991 | Yamamoto | F16H 61/22 74/473.23 |
| 6,327,928 B1 | | 12/2001 | Bowerman et al. | |
| 10,422,425 B2 | * | 9/2019 | Vermeersch | F16H 61/24 |
| 10,844,950 B2 | * | 11/2020 | Perichon | F16H 61/36 |
| 11,014,447 B2 | * | 5/2021 | Vermeersch | F16C 1/10 |
| 2015/0101904 A1 | * | 4/2015 | Rahman | F16D 23/12 192/99 R |

OTHER PUBLICATIONS

OE Gearshift Bracket Photos, 2022.

* cited by examiner

*Primary Examiner* — Terence Boes
(74) *Attorney, Agent, or Firm* — Volpe Koenig (57) ABSTRACT

A gear shift assembly for selecting a gear in a vehicle transmission that includes a multipiece clamping assembly for connecting the driver's gear selector lever. The clamping assembly has separate saddle and clamp components that are fastened together to encircle the selector lever and position the selector lever in the gear shift assembly.

10 Claims, 10 Drawing Sheets

GEARSHIFT ASSEMBLY

BACKGROUND

Gearshift levers are critical components of a vehicle as they are used to place the vehicle's drivetrain in various modes such as park, drive, etc. Column type gearshift levers are mounted to the vehicle steering column and are typically configured to be moved among a variety of positions. The typical connection between the shift lever and the selector is a split connector that utilizes a single fastener to compress a gap between the connector portions. In some instances, continued use of the gearshift lever (e.g., delivery vehicles making frequent stops) and/or the application of excessive force to the gearshift lever can cause metal fatigue and weaken the compressed connection, which can result in a failure that renders the vehicle inoperative.

DETAILED DESCRIPTION

Figure 1:
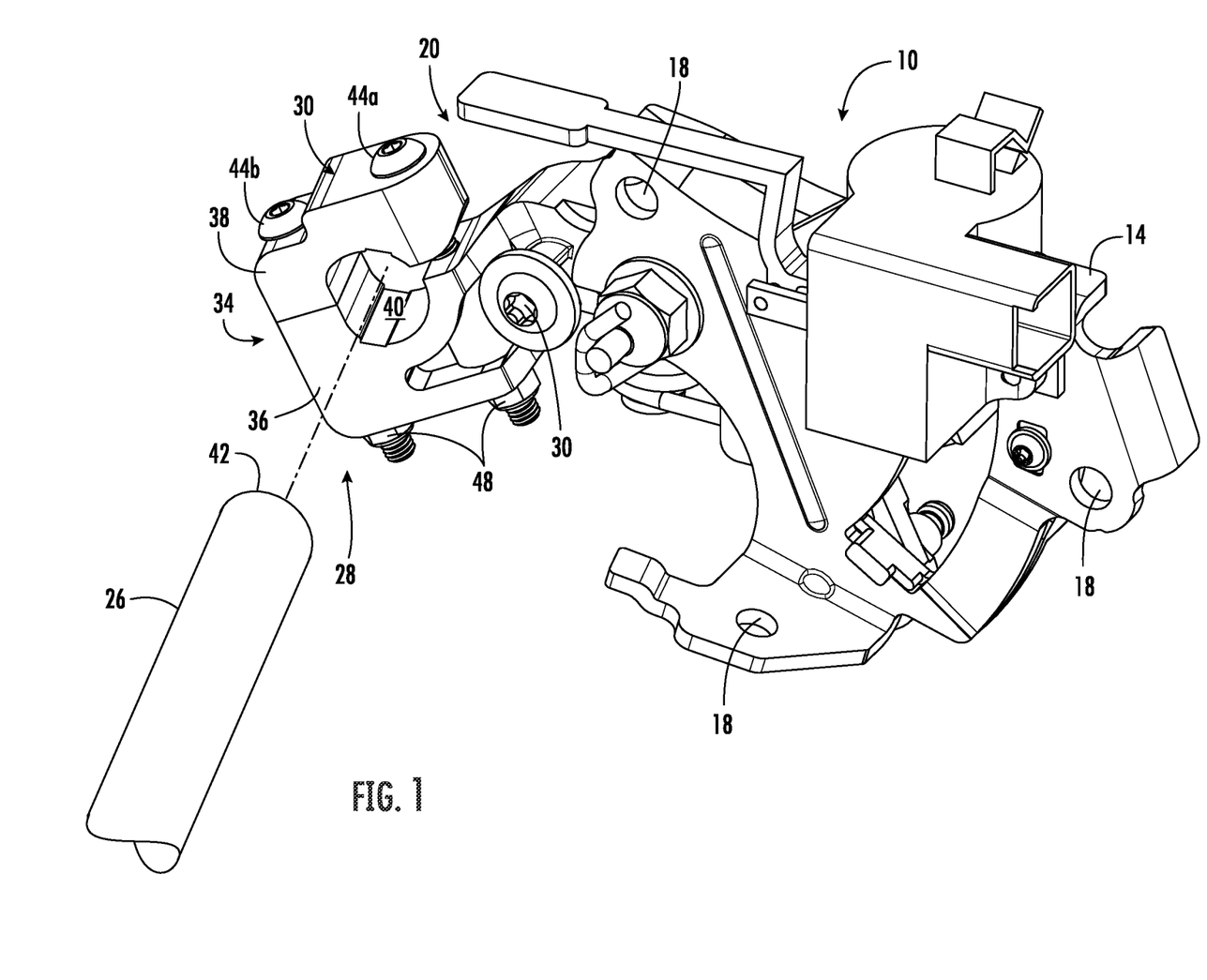
FIG. 1 is a front perspective view of a gearshift assembly with a gear shift lever selector mechanism.

The gearshift assembly, selector mechanism, and clamping assembly will be described in details with reference to the above drawings. An exemplary gearshift lever assembly is illustrated in FIG. 1 and identified generally by reference numeral 10. The exemplary gearshift lever assembly 10 includes a mounting bracket 14 for attaching the assembly to a steering column or other motor vehicle structure via one or more mounting holes 18 that are adapted to receive fasteners, such as bolts or screws (not shown), for securing the mounting bracket 14. The illustrated mounting bracket 14 of gearshift lever assembly 10 supports a gearshift selector mechanism 20 and a shift interlock solenoid 24 that selectively restricts movement of the gearshift selector mechanism 20 in conventional fashion. This portion of exemplary gearshift lever assembly 10 may vary according to the make and model of the vehicle. The gearshift selector mechanism 20 has a free end 28 that couples with a vehicle shift lever 26 in the aperture 40.

The gearshift selector mechanism 20 is fixed to the mounting bracket 14 with a bolt 30, that secured to ensure pivoting of the free end 28 of the gearshift selector mechanism 20 through a range of motion associated with manual selection of a gear by a driver of the vehicle. The movable arm 28 may be connected to the bracket body 14 by a fastener which passes through a spacer or bushing so that the bolt 30 is secured to the mounting bracket 14 without restricting the arm 28 through its range of motion.

With reference to FIGS. 1 through 4, the gearshift lever 26 is secured to the clamping assembly 34 of the shift lever arm 28 through a combination of a saddle 36 and a clamp 38 that form the clamping assembly 34. The saddle 36 clamp 38 come together in the clamping assembly 34 to define an opening 40 for receiving an end 42 of the gearshift lever 26. Bolts 44a and 44b extend through bolt holes 46 in the saddle 36 and clamp 38. Flange nuts 48 are secured to the bolts 44a and 44b and are tightened to a desired torque to secure the gearshift lever 26 within the shift lever opening 40.

Figure 2:
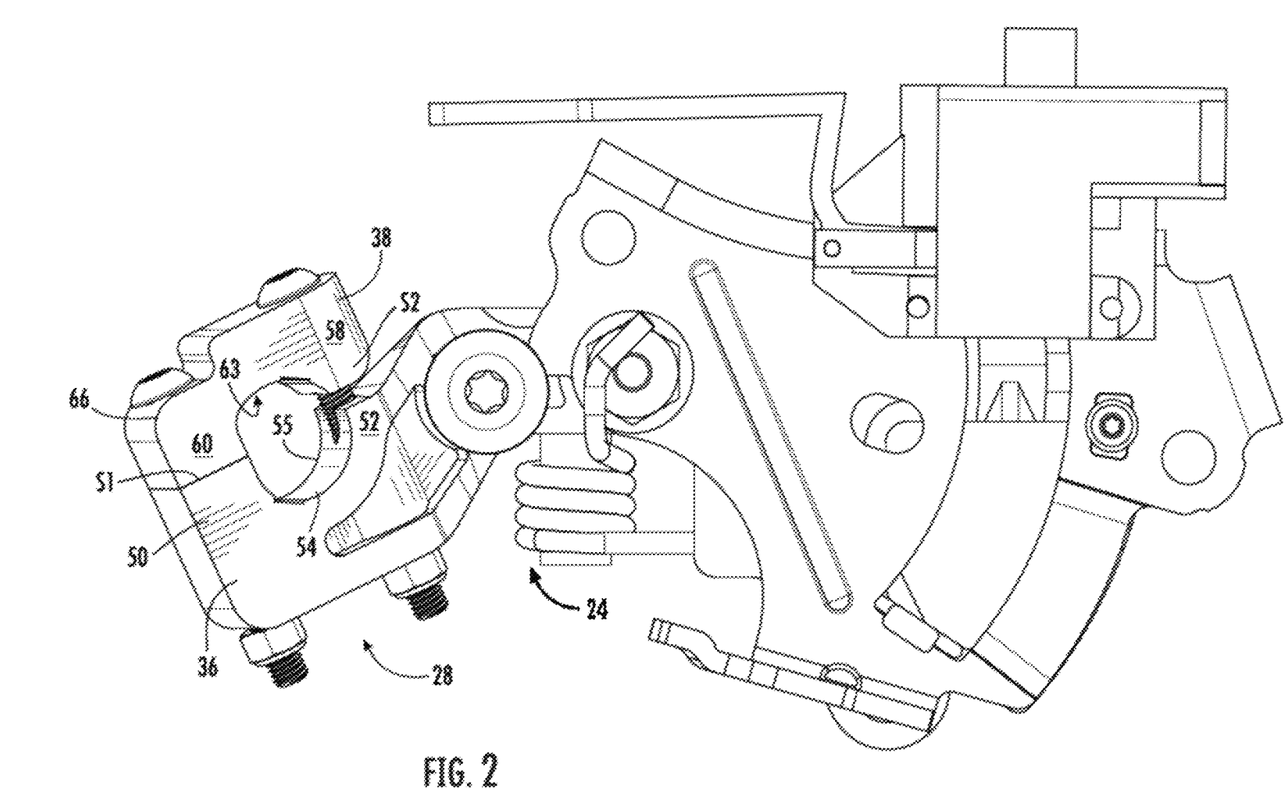
FIG. 2 is a rear perspective view of a gearshift assembly in FIG. 1.
Figure 3:
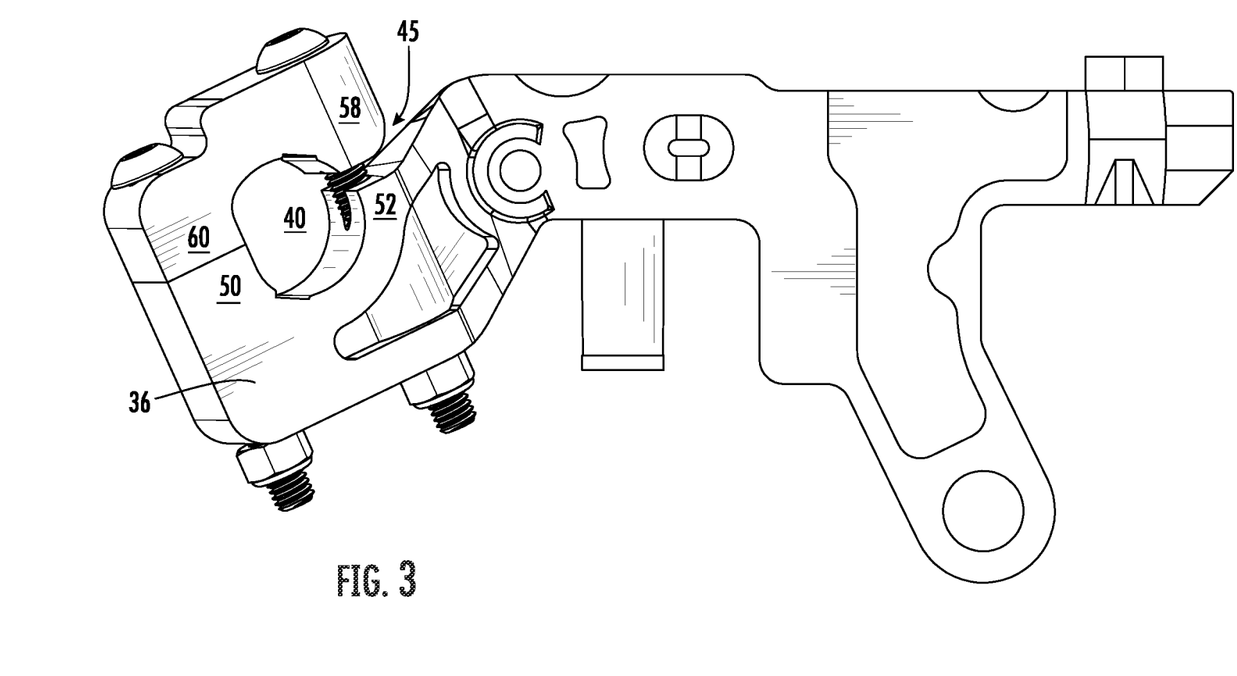
FIG. 3 is a plane view of a selector mechanism for use in the gearshift assembly illustrated in FIGS. 1 and 2.
Figure 4:
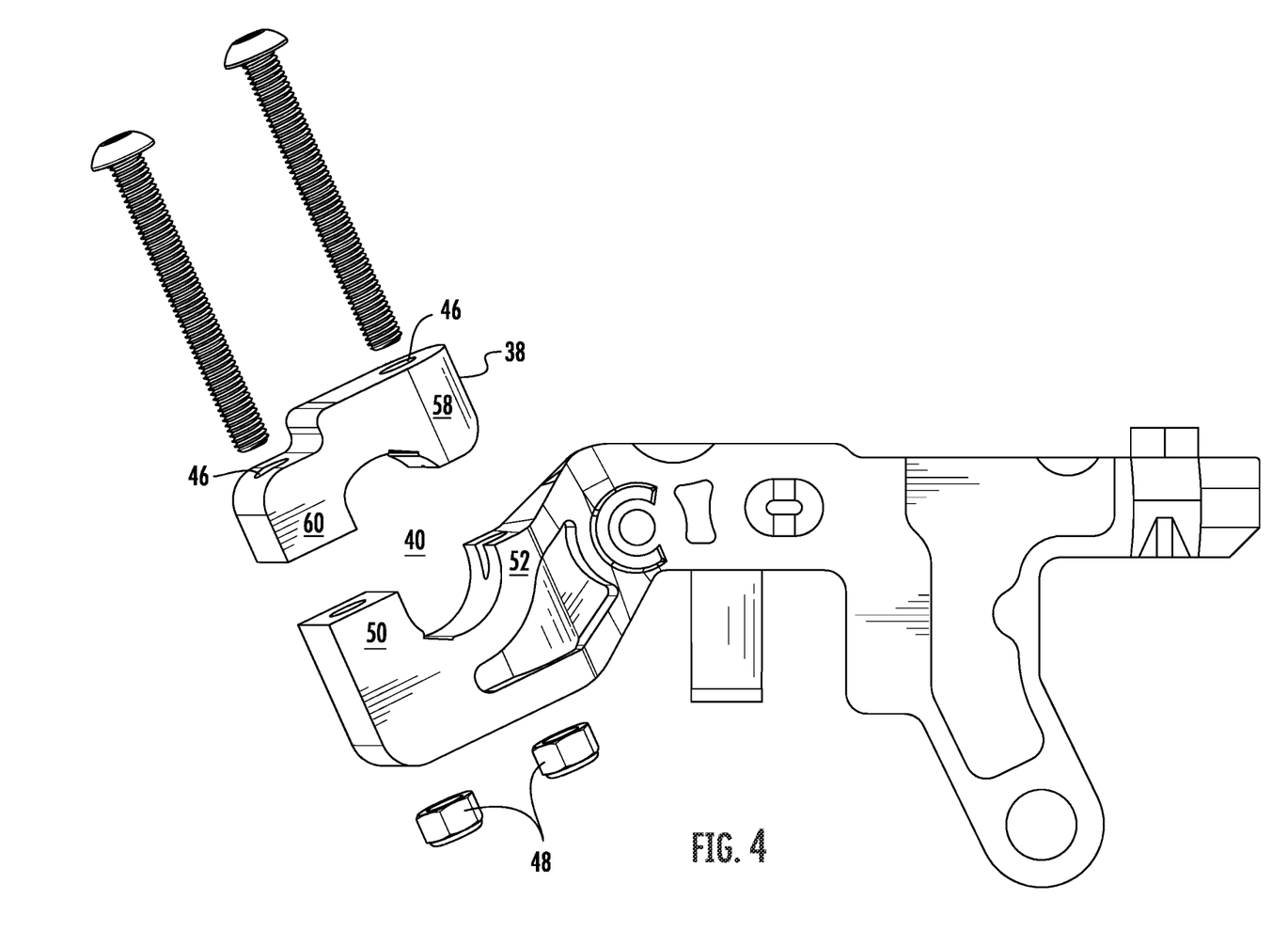
FIG. 4 is an exploded view of the clamping assembly on the selector mechanism in FIG. 3.
Figure 5:
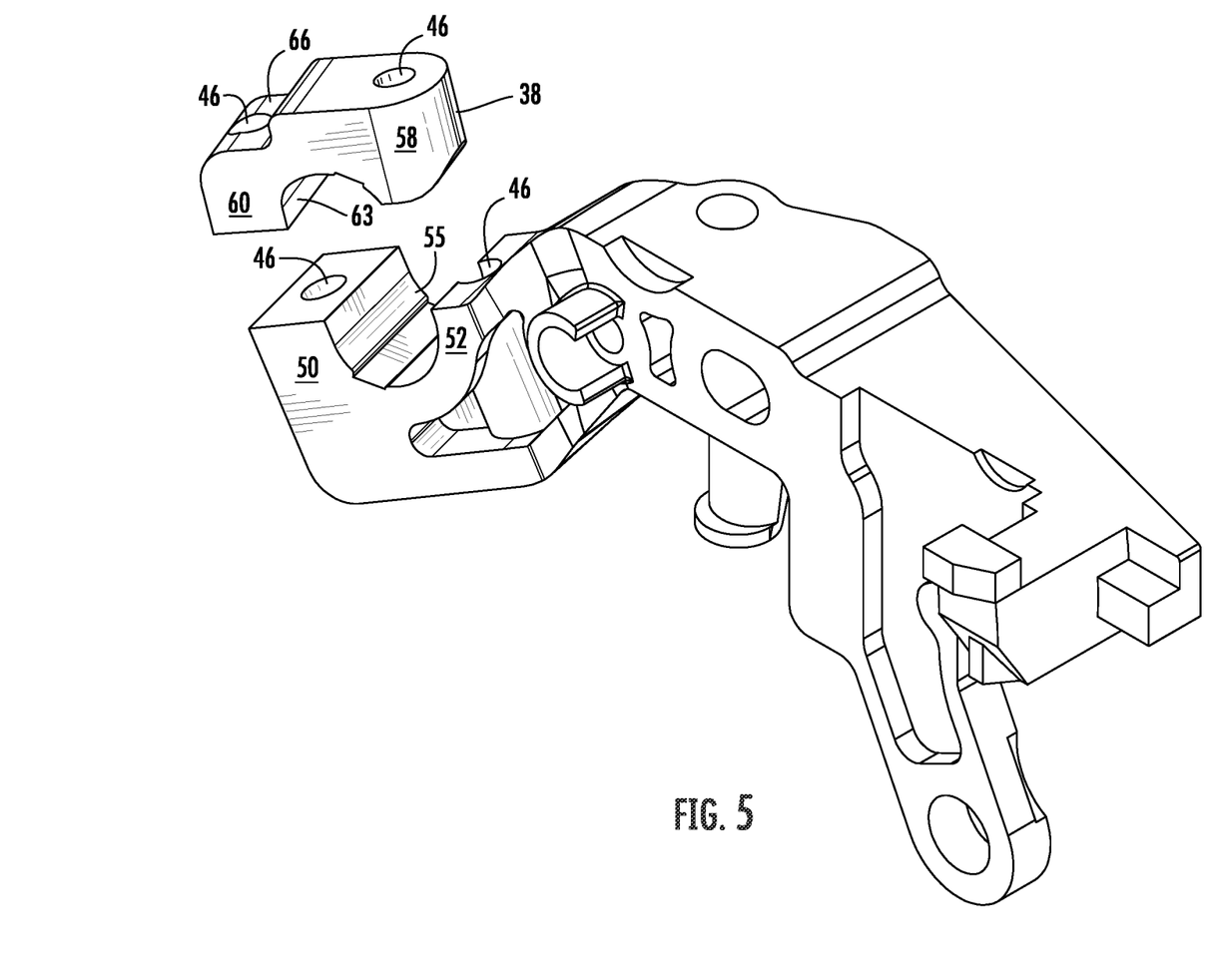
FIG. 5 is a rear perspective view of the selector mechanism in FIG. 3 with an exploded clamping assembly.
Figure 6:
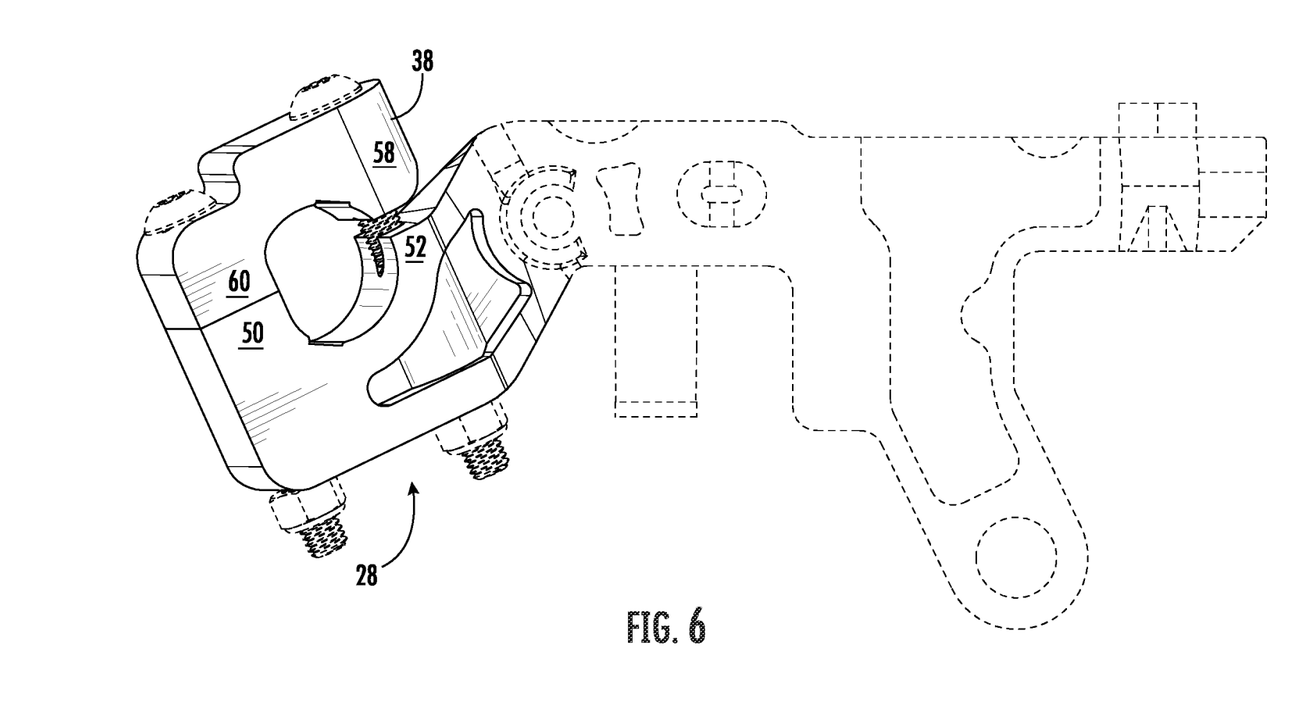
FIG. 6 is a perspective view of the closed clamping assembly of the selector mechanism in FIG. 3.
Figure 7:
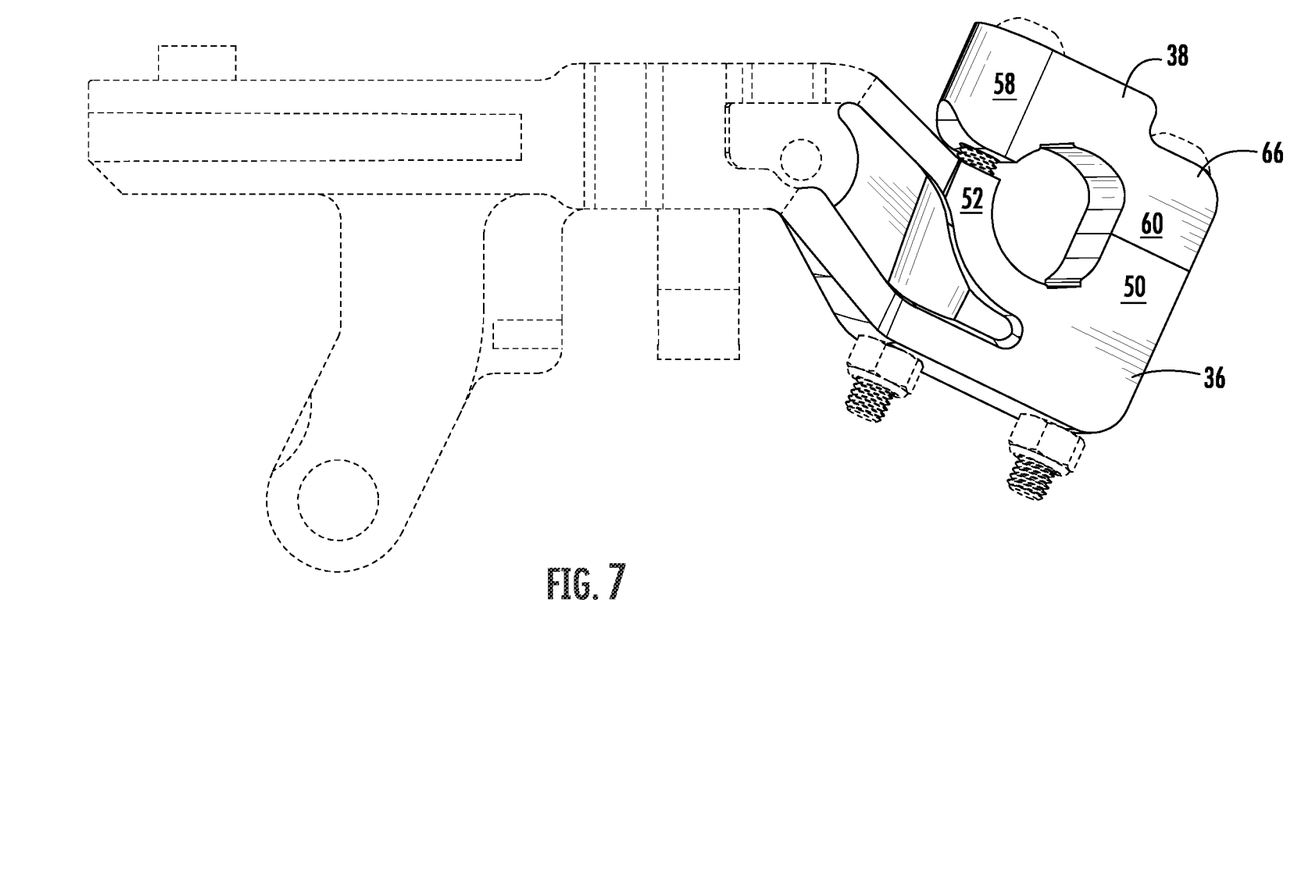
FIG. 7 is a rear plan view of the closed clamping assembly of the selector mechanism in FIG. 3.
Figure 8:
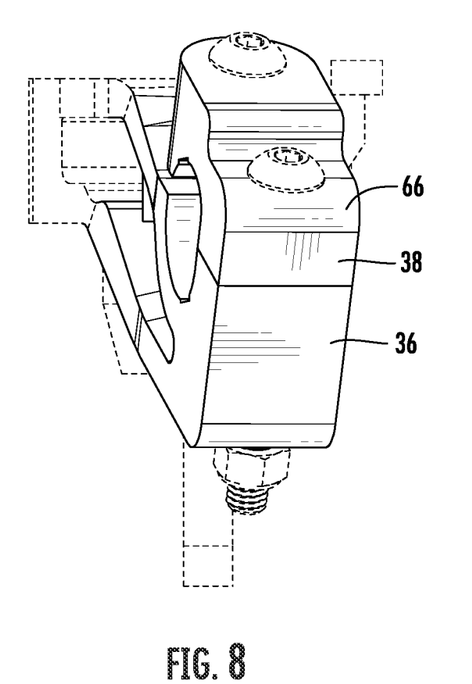
FIG. 8 is a left side view of the closed clamping assembly of the selector mechanism in FIG. 3.
Figure 9:
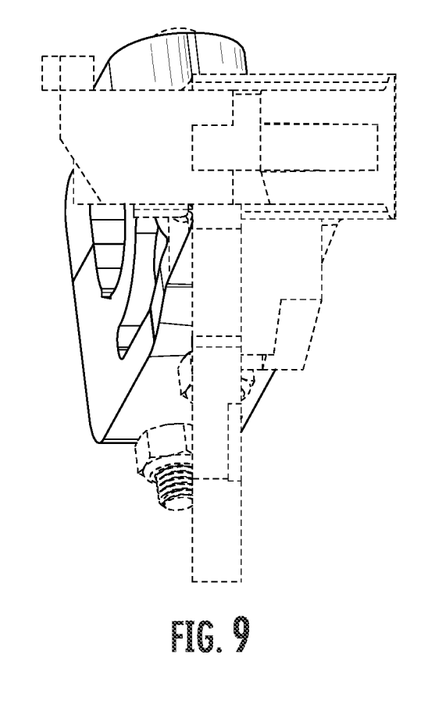
FIG. 9 is a right side view of the closed clamping assembly of the selector mechanism in FIG. 3.
Figure 10:
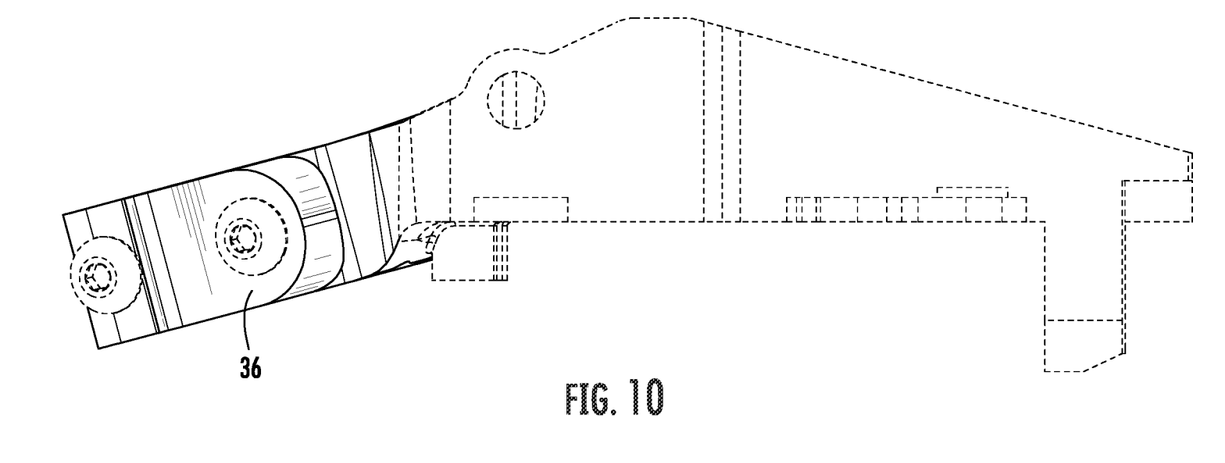
FIG. 10 is a top view of the closed clamping assembly of the selector mechanism in FIG. 3; and, FIG. 11 is a bottom view of the closed clamping assembly of the selector mechanism in FIG. 3.
Figure 11:
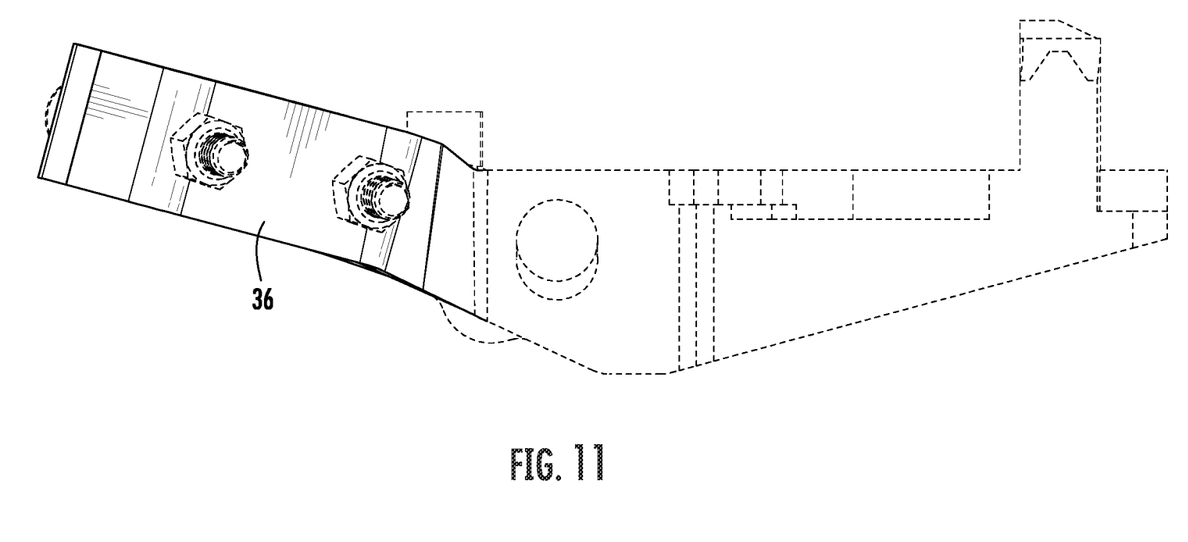

Still with reference to FIGS. 1 through 4, the saddle 36 is formed integrally with the arm 28 and generally includes first and second coplanar flanges 50 and 52 on opposing sides of a semi-circular recess 54, which preferably includes a plurality of internal grooves 55 which are illustrated a parallel to a center axis through the aperture 40. The clamp 38 is an individual component that includes first and second flanges 58 and 60 on opposing sides of a semi-circular recess 62, which preferably includes a plurality of internal grooves 63. As illustrated in FIG. 3, the flanges 58 and 60 are aligned for aligning with the first and second coplanar flanges 50 and 52. The first flange 58 has first surface S1 that is dimensioned so it contacts the flange 50 and the second flange 60 is dimensioned differently so that it has a surface S2 that does not contact the flange 52. The different between the dimensions for S1 and S2 results in a gap 45 because the flange 60 does not contact flange 52 of saddle 36, see FIGS. 1-3.

For assembly, the clamp 38 and the saddle 36 are aligned with a free end 42 of the gearshift lever 26 within the opening 40, the bolts 44a and 44b are tightened to a desired torque around the shift lever 26. Providing separate components for clamping assembly 34 to define the shift lever opening 40 and provide the gap 45 permit additional tightening to secure the shift lever 26 and distributes the stress to the fasteners 44a and 44b, which eliminates a source of compressive failures.

In an application where the size of the clamping assembly is larger than the compression clamp being replaced, clamp 38 may include a shoulder 66, see FIGS. 1 through 3, on one or both sides to make the exterior of the clamp 38 more arcuate. A preferred material for the producing the shift lever arm 28 is A380 aluminum.

What is claimed is:

1. An assembly for selecting a gear in a vehicle transmission, the assembly comprising:
   a mounting body configured for positioning the assembly in a driver accessible position in a vehicle;
   a shift selector that has a free end dimensioned to be received within a saddle that forms one portion of a vehicle gear shifter attachment;
   a clamping assembly clamp configured to mate with the saddle about the free end of the shift selector; and,
   at least two fasteners;
   whereby the saddle and the clamping assembly clamp are aligned about the free end of the shift selector and the fasteners draw the saddle and clamping assembly clamp together about the free end of the shift selector, and the saddle, the clamping assembly clamp, and the end of the shift selector move together as a unit.

2. The assembly of claim 1, wherein the saddle is an integral saddle on the free end of the shift selector and wherein the integral saddle and the clamping assembly clamp have flanges with aligned through holes.

3. The assembly of claim 2, wherein the clamping assembly clamp has one flange with a first surface S1 and another flange with a second surface S2.

4. The assembly of claim 3, wherein one of the first surface S1 and the second surface S2 forms a gap with an opposed flange of the integral saddle.

5. The assembly of claim 1, wherein the saddle and the clamping assembly clamp define a circular opening.

6. The assembly of claim 1, wherein the saddle has internal grooves.

7. The assembly of claim 1, wherein the clamping assembly clamp has internal grooves.

8. The assembly of claim 1, wherein the saddle and the clamping assembly clamp have internal grooves.

9. The assembly of claim 1, wherein the saddle and the clamping assembly clamp define a circular opening and the saddle and the clamping assembly clamp have internal grooves that run parallel to a centerline through the circular opening.

10. The assembly of claim 1, wherein the saddle and the clamping assembly clamp have flanges with aligned through holes and the through holes in the saddle are threaded to receive the fasteners.

* * * * *